US006168733B1

(12) United States Patent
Naylor et al.

(10) Patent No.: US 6,168,733 B1
(45) Date of Patent: Jan. 2, 2001

(54) METHOD FOR FORMING DISCRETE PELLETS FROM VISCOUS MATERIALS

(75) Inventors: David Mark Naylor, Kingsport; Paul Keith Scherrer, Johnson City, both of TN (US)

(73) Assignee: Eastman Chemical Company, Kingsport, TN (US)

( * ) Notice: Under 35 U.S.C. 154(b), the term of this patent shall be extended for 0 days.

(21) Appl. No.: 09/379,846

(22) Filed: Aug. 24, 1999

Related U.S. Application Data

(60) Provisional application No. 60/098,579, filed on Aug. 31, 1998.

(51) Int. Cl.[7] ....................................................... B29B 9/06
(52) U.S. Cl. ................................................................ 264/14
(58) Field of Search ................................. 264/13, 5, 11, 264/14

(56) References Cited

U.S. PATENT DOCUMENTS

| | | |
|---|---|---|
| 2,925,412 | 2/1960 | Johnston . |
| 2,988,782 | 6/1961 | Parrish et al. . |
| 3,042,970 | 7/1962 | Terenzi . |
| 3,213,170 | 10/1965 | Erdmenger et al. ................. 264/142 |
| 3,231,639 | 1/1966 | Mabru .................................... 264/12 |
| 3,320,338 | 5/1967 | Lemelson .............................. 264/14 |
| 3,414,640 | 12/1968 | Garetto et al. ......................... 264/13 |
| 3,937,772 | 2/1976 | Urban et al. ........................... 264/12 |
| 4,013,744 | 3/1977 | Kuerten et al. ........................ 264/11 |
| 4,091,058 | 5/1978 | Sander et al. ......................... 264/11 |
| 4,192,838 | 3/1980 | Keith ..................................... 264/10 |
| 4,212,837 | 7/1980 | Oguchi et al. ........................ 264/15 |
| 4,221,554 | 9/1980 | Oguchi et al. ........................... 425/7 |
| 4,224,259 | 9/1980 | Sander et al. ......................... 264/11 |
| 4,582,473 | 4/1986 | Rizzi et al. .......................... 425/225 |
| 4,600,545 | 7/1986 | Galli et al. ............................ 264/11 |
| 4,818,464 | 4/1989 | Lau ...................................... 264/510 |
| 5,071,599 | 12/1991 | McNair, Jr. et al. ................... 264/5 |
| 5,695,695 | 12/1997 | Steinau et al. ........................ 264/11 |

FOREIGN PATENT DOCUMENTS

| | | |
|---|---|---|
| 976 913 | 2/1965 | (DE) . |
| 0 711 512 A2 | 5/1996 | (EP) . |
| 1134535 | 11/1968 | (GB) . |

Primary Examiner—Mary Lynn Theisen
(74) Attorney, Agent, or Firm—Cheryl Tubach; Harry Gwinnell

(57) ABSTRACT

A process for making pellets from a viscous material includes the steps of extruding the viscous material from a first conduit into a pelletizing fluid in a first zone; and passing the extruded viscous material and pelletizing fluid into a second zone having an increase in the velocity of the pelletizing fluid and a step-wise reduction in the pressure relative to the first zone. Advantageously, this step change combination produces sufficient forces by the pelleting fluid on the viscous material sufficiently to form discrete pellets of a substantially uniform size distribution.

25 Claims, 4 Drawing Sheets

METHOD FOR FORMING DISCRETE PELLETS FROM VISCOUS MATERIALS

CROSS-REFERENCE TO RELATED APPLICATIONS

This application claims benefit under 35 U.S.C. § 119(e) to the application having U.S. Ser. No. 60/098,579 filed Aug. 31, 1998, the disclosure of which is incorporated herein by reference.

BACKGROUND OF THE INVENTION

1. Field of the Invention

The present invention relates to a process for forming pellets from viscous materials including solutions and melts. More particularly, the present invention relates to a process for forming pellets from viscous materials using a step-wise pressure differential and increase in fluid velocity. The present process is particularly useful for making pellets of a substantially uniform size from viscous materials having a viscosity greater than about 40,000 centipoise.

2. Description of the Related Art

Polymer pellets are formed commercially by several different methods. The current methods for pelletizing viscous polymer solutions and melts are highly mechanical in nature. These devices involve blades, wires or pumps that are used to cut polymer strands into pellets, or dropping liquid polymer pellets onto moving trays to harden into pellets, or vibrating strands of liquid polymer into pellets. Because of the mechanical nature of these processes, maintenance, energy and labor costs can be a significant part of the overall cost of making the product.

Pelleting of viscous material solutions and melts is widely practiced on a commercial scale. Current practice includes many different variations of the following pelleting systems:

1. Under water pellet cutters. These devices use a series of blades or a pump to cut polymer strands into pellets. The cutting blades can be placed immediately after the polymer is extruded out of the die face, or some distance down stream from the die face. The process is carried out under water.
2. Pastilles (hemispherical pellets) can be formed using a process such as the process known under the trademark "SANDVIK ROTOFORM PROCESS". In this process small blobs of liquid polymer are dropped onto a moving steel belt. The belt is cooled with water which serves to cool and solidify the polymer, forming the pellet.
3. Microsphere technology produces spherical beads ranging from 0.2 to 5 mm diameter. Liquid polymer is pumped through a vibrating nozzle, and the fluid stream breaks into uniform droplets. This process is currently limited to low viscosity solutions.

U.S. Pat. No. 3,414,640 discloses a method of precipitating and forming cellulose ester granules. The cellulose ester solution is extruded through die holes, and the polymer extruding out of the die holes is cut into granules with a blade periodically swept over the surface.

U.S. Pat. No. 3,213,170 discloses a method for making granulated materials by continuously extruding the material through a die opening and directing a stream of gas transversely to the direction of the extrusion to force the extruded material to break off from the opening.

U.S. Pat. No. 4,192,838 discloses a process for making fibers from cellulose acetate dopes. The process uses a capillary needle to introduce the polymer solution into the throat of a venturi orifice. This process produces cellulose ester fibrets that are similar to natural fibers in morphology and size.

U.S. Pat. No. 4,013,744 discloses a process for producing fibrids by extruding strands of molten thermoplastic polymer through orifices into a shear gradient zone created by a propulsive jet of liquid flowing at 10 to 100 meters/second.

In the production of organic derivatives of cellulose, and especially organic esters of cellulose, such as cellulose acetate, cellulose propionate and cellulose butyrate, the esterification of cellulose with an organic acid results in a solution of the derivative of cellulose in an acid solvent. For example, in making cellulose acetate, cellulose is acetylated by contacting a cellulosic material with acetic anhydride and a catalyst in the presence of acetic acid. The acetic acid dissolves the cellulose acetate that is formed to produce a very heavy and viscous solution, referred to herein as the "acid dope". Usually after hydrolysis, this solution of cellulose acetate is precipitated by adding water until the concentration of the acid reaches a point below which the acid will not hold the cellulose acetate in solution.

The isolation of cellulose acetate, or secondary cellulose materials, from organic solvent solutions, referred to herein as "solvent dope", has been extensively investigated. The known process for preparing cellulose acetate, i.e., a cellulose acetate with an approximate average degree of substitution of 2.5, with its acetylation and hydrolysis steps, results in a solution of the acetate in an acetic acid and water mixture. As noted above, one practice for precipitating cellulose acetate from the reaction mixtures obtained in the acetylation of cellulose, is to introduce the reaction mixture in pellet form into a greater volume of water.

Accordingly, there is a need for a process of forming discretely identifiable pellets using equipment having little or no moving parts. There is further a need for making pellets of a substantially uniform size from a viscous material.

SUMMARY OF THE INVENTION

The present invention provides a process for forming discrete pellets from viscous materials, i.e., discrete pellets from a viscous material such as polymer solutions and melts. Briefly, in the process, a strand of viscous material is extruded through a first zone of relatively slow moving pelleting fluid before entering a second zone of fast moving pelleting fluid. The first zone establishes the pellet length, and the second zone serves to form the pellet by separating the pellet from the extruding strand. An advantage of the present process is that it requires no moving parts to form pellets from a viscous material. The process includes the steps of extruding a viscous material from a first conduit into a pelleting fluid in a first zone; and passing the extruded viscous material and the pelleting fluid into a second zone having a relatively lower pressure than the first zone so that the velocity of the pelleting fluid and viscous material increases substantially to form discrete pellets.

In a preferred embodiment of the invention, the process includes providing a viscous material in a first conduit; providing a pelleting fluid in a second conduit which at least partially surrounds the first conduit; extruding the viscous material from the first conduit into the pelleting fluid stream in a first zone; and passing the pelleting fluid stream and the extruded viscous material through a second zone having a means for restricting or partially blocking the pelleting fluid stream so that the pelleting fluid stream velocity increases substantially and produces a step-wise reduction in the pelleting fluid pressure and forms a discrete pellet from the viscous material.

It is an object of the present invention to provide a process in which discrete pellets of substantially uniform dimensions can be formed from a viscous material and overcoming the drawback of requiring moving parts for forming the pellets.

Other objects and advantages of the present invention will become more apparent to those skilled in the art in view of the following description and the accompanying drawings where in the various views and drawings of figures, like reference numerals will designate similar parts throughout.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION OF THE INVENTION

Figure 1A:
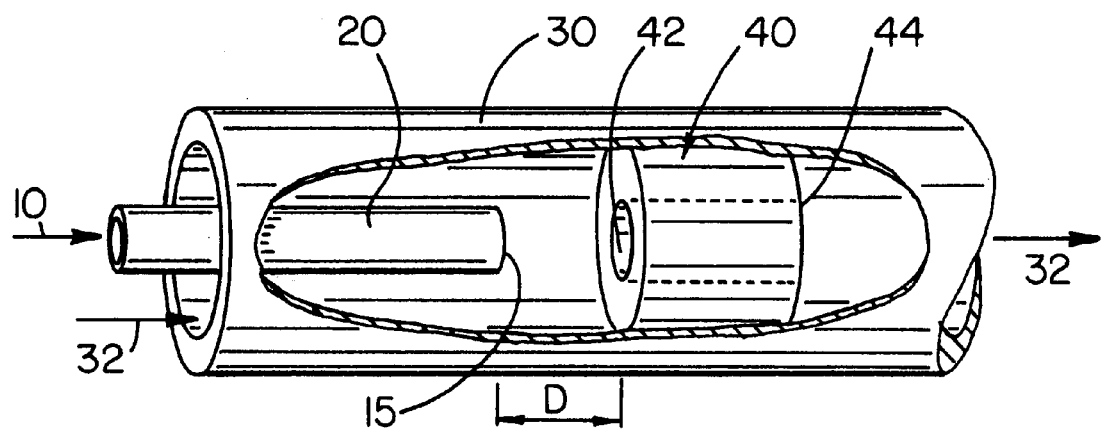
FIG. 1A is an illustration showing a device suitable for the practice of the present invention.

In accordance with the present invention there is provided a process for forming discrete pellets of a viscous material. Although not to be bound by any theory, it is believed that the present invention uses a step change in the pressure and shear forces on the extrudate surface to form pellets.

Referring to FIGS. 1A–2D for describing in greater detail one embodiment of the process of the present invention, viscous material 10 to be pelletized is pumped or extruded through a first opening 15 of the first conduit 20 and into a first zone. The first conduit 20 is at least partially circumferentially surrounded by an outer jacket or second conduit 30 through which a pelletizing fluid 32 flows. The first zone has a length, also referred to herein as the "gap length", defined as the by the distance, "D" from the first opening 15 to the beginning of the second zone 40, (also referred to herein as a low pressure zone or constriction zone).

Figure 1B:
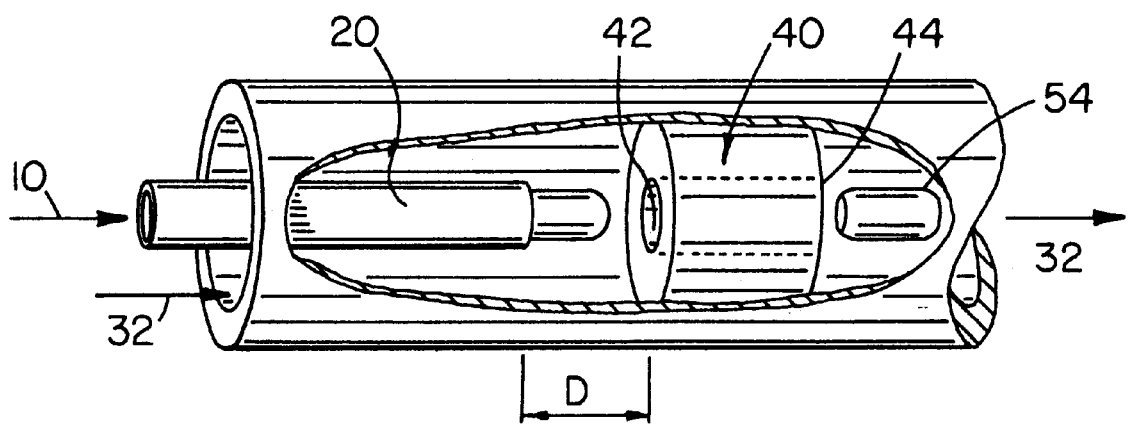
FIG. 1B is an illustration showing pellets being formed using the device illustrated in FIG. 1A.

In FIGS. 1A and 1B, the second zone 40 is illustrated as a short section of reduced diameter pipe residing inside of the outer tube 30. The reduced diameter pipe may be affixed to the inside of the second conduit 30 in a manner that provides a rigid or fixed position or may be attached using means that provides for varying the distance D and consequently varying the first zone length.

Figure 2A:
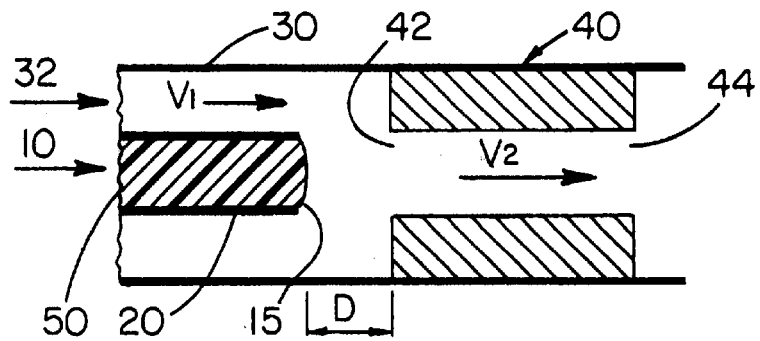
FIG. 2A is a cross-sectional illustration showing the viscous material being extruded from the inner conduit in the formation of a pellet in accordance with the present invention.
Figure 2B:
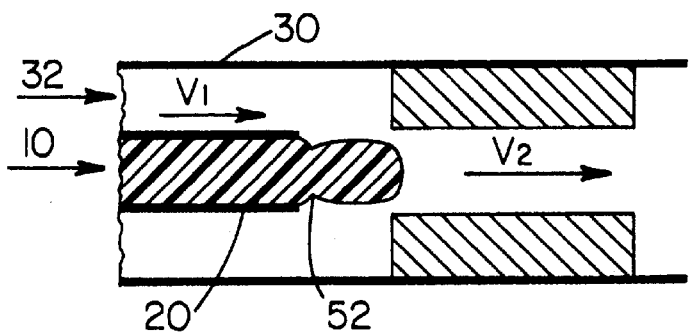
FIG. 2B is a cross-sectional illustration showing a strand of viscous material as it enters the low pressure zone or second zone.
Figure 2C:
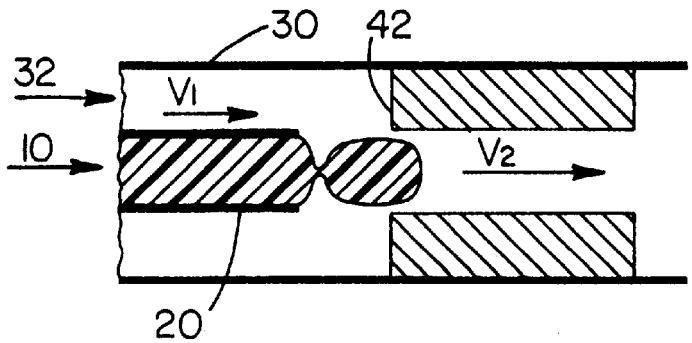
FIG. 2C is a cross-sectional illustration showing the formation of a pellet in accordance with the present invention as the viscous material enters the second zone.
Figure 2D:
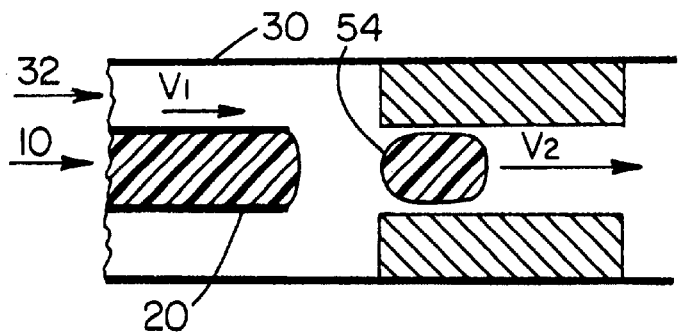
FIG. 2D is a cross-sectional illustration showing a pellet formed in accordance with the process of the present invention.

The second or constriction zone 40 reduces the cross-sectional area of the pelletizing fluid flow relative to conduit 30 producing a step-wise reduction in pelleting fluid pressure and an increase in pelleting fluid velocity relative to the first zone. The second zone 40 includes a restriction means for impeding or blocking the passage of the pelleting fluid. The restriction means may be made from any material having a fluid impermeable or semi-impermeable surface. The constriction zone 40 further includes a second opening 42 in the restriction means for providing a passage through the restriction means so the pellets and pelleting fluid may pass. In the embodiment shown, the second opening 42 in the second zone 40 is in substantial alignment with the first opening 15 of the first conduit 20. The sudden change in diameters from the inside diameter of the second conduit 30 in the first zone to the diameter of the second opening 42 in the constriction zone 40 causes a localized high pelletizing fluid velocity and a step-wise reduction in pressure proximate to the opening 42 of constriction zone 40. When the extruded viscous material strand reaches the second opening 42, the increased localized pelletizing fluid velocity and low pressure results in a force that exceeds the internal cohesive forces holding together the viscous material strand. As a result, a pellet is formed and pulled away. The pellet and pelletizing fluid flow through the constriction zone 40 and proceed down-stream, as shown in FIGS. 1B and 2D.

Although not wishing to be bound by any theory, it is thought that the process of the present invention segments viscous materials into pellets by a step-wise decrease in pressure and increase in shear force exerted upon the viscous material. This is accomplished by increasing the velocity of the pelletizing fluid in the constriction zone due to a reduction in cross-sectional area of the passageway relative to the cross-sectional area of the second conduit in the first zone. This decreased pressure and increased pelleting fluid velocity increases the drag on the strand. Accordingly, the flow rate of the pelletizing fluid in the constriction zone should be great enough to generate or produce a force sufficient to break the cohesive bonds of the viscous material.

As shown, the constriction zone 40 is a substantially annular member through which the pelletizing fluid and pellet must pass. However, the constriction zone 40 can be any shape that produces a step-wise reduction in pressure proximate the second opening 42. Desirably, the diameter of the second opening 42 is larger than the inside diameter of the first conduit 20 so that the pellet may pass, along with the pelletizing fluid, through the second zone 40 without clogging the second opening 42. However, depending upon the physical properties of the viscous material being pelletized, it is possible for the second opening 42 to be of a size equal to or slightly less than the diameter of the first conduit opening 15 through which the viscous material is extruded.

Pellet length is determined by the first zone distance "D" as measured from the first opening 15 to the second opening 42. This distance, D, is also referred to herein as the gap length. Pellets of various length can be formed by changing the gap length. It is also possible to form spherical pellets by setting the gap length approximately equal to the inner diameter of the inner tube orifice 15. The gap length must be greater than zero in order to maintain control of pellet length in accordance with the invention.

Although the preferred embodiments of the inner and outer conduits of the invention are illustrated in the drawings as having a cylindrical configuration, conduits having cross-sections other than circular may also be employed without departing from the scope of the invention. For example, the first and second conduits may have square, triangular or slotted configurations depending upon the desired application of the product.

Moreover, the inner tube opening geometry can have a variety of shapes. For example, the opening 15 of the first conduit 20 can have an edge that is blunt or squared off, sharp edged, concave, convex, rounded or combinations thereof The entrance 42 and exit 44 of the restriction channel can also be independently shaped to influence the water flow into and out of the constriction zone 40. For example, the openings can be concave or convex. In the illustrated embodiment, the restriction means of the second zone 40 includes a surface that is substantially perpendicular to the center-line of inner tube 20 and outer tube 30. Opening 42 extends through this surface to define a channel through which pellets and pelletizing fluid pass.

Referring to FIGS. 2A–2D, formation of a pellet is illustrated in greater detail. A viscous material is extruded at the first opening 15 of the tube 20 into a pelletizing fluid 32 in the first zone. The pelletizing fluid 32 is flowing in the volume defined by the outer diameter of the inner tube 20 and the inner diameter of the outer tube 30. The pelletizing fluid is shown moving with a velocity ($V_1$). When the viscous material strand reaches the second opening 42, the increased forces on the extruding strand resulting from a decreased pressure and an increased fluid velocity in the constriction zone 40 causes the strand to break off, forming a new pellet. The break 52 forms at or proximate to the opening 15, and the newly formed pellet 54 is carried off with the pelletizing fluid, at the velocity of the fluid ($V_2$). Formation of a pellet is repeated every time the viscous material strand reaches the second opening 42. For a given pelleting fluid and given flow rate, the size of the clearance between the outer circumference of the pellet 54 and the inner circumference of the second opening 42 is the primary factor effecting pressure drop.

As illustrated, the pelletizing fluid is moving in substantially the same direction as the flow of extruding viscous material. However, the pelletizing fluid can be moving in any direction relative to the viscous material flow. It is only important in the process of the current invention for the pelletizing fluid and the viscous material to have a coincidal fluid flow through the second opening 42 of the constriction zone.

The pelletizing fluid can be any fluid or mixture of fluids that will produce a step-wise pressure drop and fluid velocity increase at the constriction zone. Suitable pelletizing fluids include single phase fluid systems such as water, water-acid mixtures, water-base mixtures, liquid-solvent mixtures such as water-acetone, water-methyl ethyl ketone, air, steam, and nitrogen; or two phase liquid-gas mixtures, such as, water-air and/or nitrogen, water-acid-air and/or nitrogen mixtures, water-base-air and/or nitrogen mixtures, liquid-solvent-air and/or nitrogen mixtures such as water-acetone- air and/or nitrogen, water-methyl ethyl ketone-air and/or nitrogen for example.

The unobstructed average velocity ($V_2$) in the constriction zone must be kept above a minimum value in order for the pellet to form. If the flow rate is less than the minimum rate, then the extruding polymer does not break into pellets, instead long strands are formed. For example, when the viscous material is a dope, either acid or solution dope, of a cellulose ester, such as cellulose acetate, having a flow rate of about ½ pound per minute and a viscosity greater than about 40,000 centipoise (cp), the linear velocity ($V_2$) of the to pelletizing fluid in the constriction zone should be greater than about 3 feet/second (ft/sec) to prevent long strands from occurring. Depending upon the viscous material rheology, it is foreseeable that flow rates ($V_2$) of less than 3 ft/sec may be utilized.

The process of the present invention may be used to make discrete pellets of a variety of viscous materials. Non-limiting examples of suitable materials include: esters and polyesters of dicarboxylic acids such as terephthalic acid and naphthalic acid and diols, such as ethylene glycol and diethylene glycol to form PET and PEN; cellulose derivatives such as organic esters and ethers of cellulose, such as, cellulose acetate, cellulose propionate, cellulose butyrate, ethyl cellulose, methyl cellulose and benzyl cellulose; polyolefins, such as polyethylene and polypropylene; polyamides; polystyrenes; copolymers of the aforementioned polymers, and mixtures thereof. Additionally, the materials that are extruded and formed into pellets in accordance with this invention can be any material that has the necessary characteristics to allow forming the material into a strand that can be broken off into pellets by a fluid being passed along the outer periphery of the strand to create a drag force that exceeds the internal cohesive forces holding the strand together.

Although the process is shown and described as having two conduits, 20 and 30, for fluid flow, it is to be understood that the process is not limited to such a configuration. For example, two die plates having one or more openings may be used. The first die plate extrudes the viscous material and the second die plate, through which the pelletizing fluid and viscous material flows, is positioned at some distance D from the first die plate, (not shown). Accordingly, other configurations may be utilized where pellets may be formed in accordance with the present invention.

The invention is further illustrated in the following examples wherein variables common to a series of runs are set forth, along with the specific results of each run. In all the examples, cellulose acetate dope was injected into an inner tube and a liquid, gas, or a mixture of both was used as the pelleting fluid.

COMPARATIVE EXAMPLE

Figure 3:
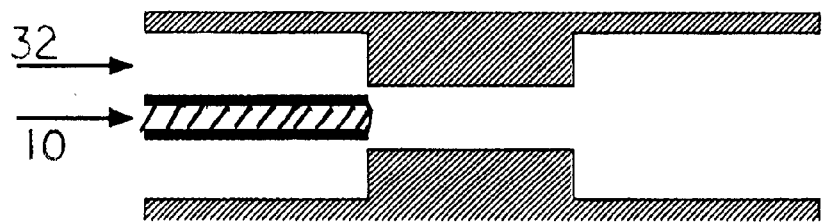
FIG. 3 is a cross-sectional illustration showing a process not in accordance with the present invention where the viscous material does not experience a step wise reduction in pressure, after entering the pelleting fluid stream.
Figure 4:
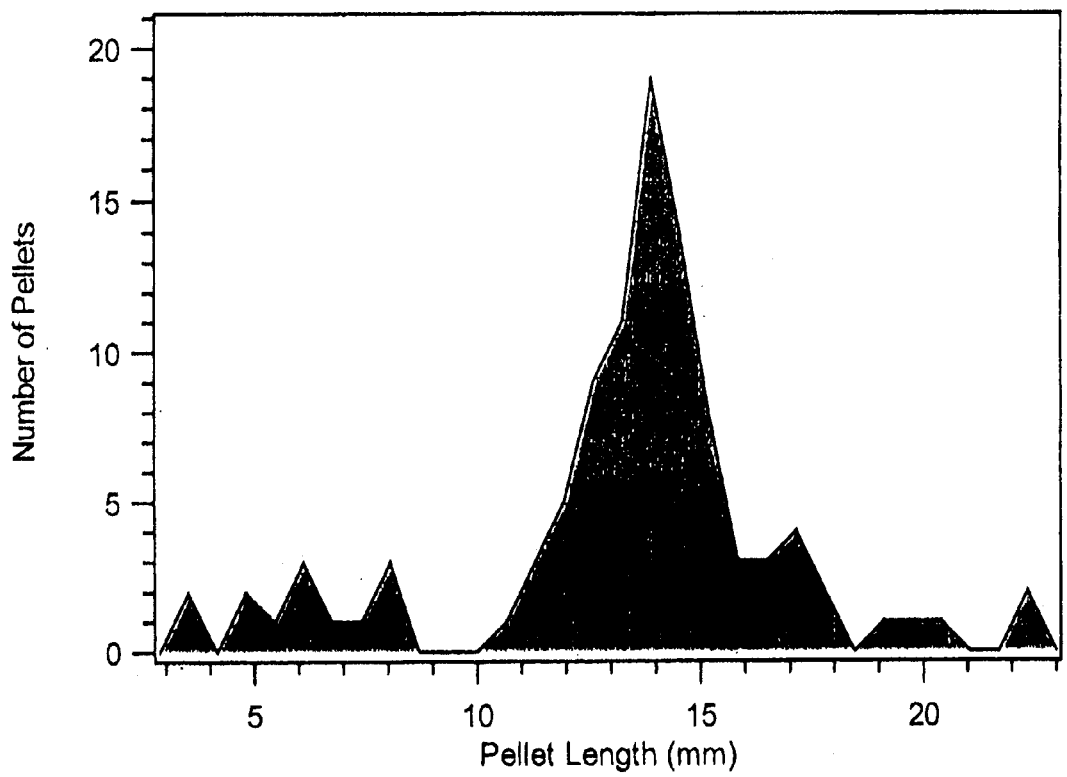
FIG. 4 is a histogram of pellet size distribution illustrating the wide range of pellet sizes produced from the process shown in FIG. 3.

Referring to FIGS. 3 and 4, a cellulose acetate dope was formed into pellets under the following conditions:

| | | |
|---|---|---|
| Dope Orifice ID | 5/32 inch | (0.397 cm) |
| Dope pipe OD | ¼ inch | (0.635 cm) |
| Water pipe narrow ID | ⅜ inch | (0.953 cm) |
| Water pipe wide ID | 1.0 inch | (2.54 cm) |
| Dope flow rate | 0.022 lbs/min | (10.0 gr/min.) |
| Water flow rate | 3.5 gpm | (13.25 lit/min) |
| Water temp. | 81.54° F. | (26.49° C.) |
| Dope temp. | 76.36° F. | (23.72° C.) |
| Dope viscosity | 200,000 cp | |
| No. of pellets measured | 100 | |
| Average pellet length | 0.516 inch | (1.31 cm) |
| Std. deviation in length | 0.146 inch | (0.37 cm) |

From this comparative example, it is clear that pellets produced using a process similar to that described in the prior art have an unacceptably high standard deviation, greater than 28%. Moreover, as seen in FIG. 4, a histogram of pellet size illustrates how if one were designing a system for processing certain size materials the prior art would make this very difficult.

EXAMPLE 1

In this example, the conditions were as stated above for the Comparative Example with the following exception, the inner pipe was placed at a distance, D, of 0.512 inch (1.3 cm), (vs. 0 for the Comparative Example), measured from the viscous material first opening to the constriction zone second opening, in accordance with the present invention, so that pellets having a size of about equal to those formed in the Comparative Example would be produced. From FIG. 5, it is clear that pellets formed using the process of the present invention have an unexpected and surprisingly consistent size, 0.537 inch (1.365 cm) with only 0.011 inch (0.028 cm) standard deviation in size or about 2.0% standard deviation.

EXAMPLES 2–5
Variables common to examples 2–5 are listed below:

| | | |
|---|---|---|
| Linear Dope flow rate | 0.031 ft/sec | (0.0094 m/sec) |
| Dope mass flow rate | 0.02 lb/min | (10.0 gr/min) |
| Water flow (pre constr.) | 3.08 ft/sec | (0.939 m/sec) |
| Water flow (in constr.) | 26.2 ft/sec | (7.97 m/sec) |
| Volumetric water flow | 4.00 gal/min | (15.14 lit/min) |
| Constriction zone ID | 0.250 in | (0.635 cm) |
| Dope Orifice ID | 0.180 in | (0.457 cm) |
| Dope Temperature | 72.0° F. | (22.2° C.) |
| Water Temperature | 53.0° F. | (11.7° C.) |
| Dope viscosity | 186,000 cp | |
| Dope % polymer | 20.0 wt % | |
| Number of pellets measured | 20 | |
| Example 2 | | |
| Gap length | 0.197 inch | (0.5 cm) |
| Average pellet length | 0.180 in | (0.457 cm) |
| Std Dev of Ave Length | 0.009 in | (0.023 cm) |
| Average pellet diameter | 0.152 in | (0.385 cm) |
| Std Dev of Ave Diam | 0.005 in | (0.013 cm) |
| Example 3 | | |
| Gap length | 0.394 inch | (1.0 cm) |
| Average pellet length | 0.350 in | (0.890 cm) |
| Std Dev of Ave Length | 0.010 in | (0.025 cm) |
| Average pellet diameter | 0.350 in | (0.890 cm) |
| Std Dev of Ave Diam | 0.005 in | (0.012 cm) |
| Example 4 | | |
| Gap length | 0.787 inch | (2.0 cm) |
| Average pellet length | 0.676 in | (1.717 cm) |
| Std Dev of Ave Length | 0.012 in | (0.030 cm) |
| Average pellet diameter | 0.194 in | (0.493 cm) |
| Std Dev of Ave Diam | 0.005 in | (0.013 cm) |
| Example 5 | | |
| Gap length | 1.181 inch | (3.0 cm) |
| Average pellet length | 1.103 in | (2.802 cm) |
| Std Dev of Ave Length | 0.053 in | (0.134 cm) |
| Average pellet diameter | 0.211 in | (0.537 cm) |
| Std Dev of Ave Diam | 0.012 in | (0.031 cm) |

Examples 2–5 demonstrate that as the gap length increases (0.197 to 1.181 in), the pellet length also increases (0.180 to 1.103 in). Accordingly, the pellet length is directly proportional to the gap length D (FIG. 1).

EXAMPLE 6

| | | |
|---|---|---|
| Linear Dope flow rate | 0.039 ft/sec | (0.0119 m/sec) |
| Dope mass flow rate | 0.02 lb/min | (9.6 gr/min) |
| Water flow (pre constr.) | 1.21 ft/sec | (0.369 m/sec) |
| Water flow (in constr.) | 29.2 ft/sec | (8.91 m/sec) |
| Volumetric water flow | 2.95 gal/min | (11.17 lit/min) |
| Constriction zone ID | 0.203 in | (0.516 cm) |
| Dope Orifice ID | 0.156 in | (0.397 cm) |
| Dope Temperature | 80.3° F. | (26.9° C.) |
| Water Temperature | 71.9° F. | (22.2° C.) |
| Dope viscosity | 200,000 cp | |
| Dope % polymer | 22.0 wt % | |
| Number of pellets measured | 21 | |
| Gap length | 12.0 inch | (30.5 cm) |
| Average pellet length | 11.97 in | (30.40 cm) |
| Std Dev of Ave Length | 0.113 in | (0.288 cm) |
| Average pellet diameter | 0.167 in | (0.425 cm) |
| Std Dev of Ave Diam | 0.003 in | (0.007 cm) |

Example 6 demonstrates that longer pellets can be produced by using a longer gap length; the result of a 12.0 inch gap length, 11.97 inch long pellets.

EXAMPLES 7–11
Variables common to examples 7–11 are listed below:

| | | |
|---|---|---|
| Linear Dope flow rate | 0.031 ft/sec | (0.0094 m/sec) |
| Dope mass flow rate | 0.02 lb/min | (10.0 gr/min) |
| Gap Length | 0.394 inch | (1.00 cm) |
| Constriction zone ID | 0.250 in | (0.635 cm) |
| Dope Orifice ID | 0.180 in | (0.457 cm) |
| Dope Temperature | 72.0° F. | (22.2° C.) |
| Water Temperature | 53.0° F. | (11.7° C.) |
| Dope viscosity | 186,000 cp | |
| Number of pellets measured | 20 | |
| Dope % polymer | 20.0 wt% | |
| Example 7 | | |
| Water flow (in constr.) | 6.540 ft/sec | (2.0 m/sec) |
| Water flow (pre constr.) | 0.770 ft/sec | (0.235 m/sec) |
| Volumetric Water flow rate | 1.000 gal/min | (3.785 lit/min) |
| Average pellet length | 0.449 in | (1.140 cm) |
| Std Dev of Ave Length | 0.006 in | (0.015 cm) |
| Average pellet diameter | 0.190 in | (0.482 cm) |
| Std Dev of Ave Diam | 0.005 in | (0.013 cm) |
| Example 8 | | |
| Water flow (in constr.) | 13.080 ft/sec | (3.99 m/sec) |
| Water flow (pre constr.) | 1.540 ft/sec | (0.469 m/sec) |
| Volumetric Water flow rate | 2.000 gal/min | (7.57 lit/min) |
| Average pellet length | 0.396 in | (1.007 cm) |
| Std Dev of Ave Length | 0.007 in | (0.018 cm) |
| Average pellet diameter | 0.180 in | (0.458 cm) |
| Std Dev of Ave Diam | 0.004 in | (0.010 cm) |
| Example 9 | | |
| Water flow (in constr.) | 19.620 ft/sec | (5.98 m/sec) |
| Water flow (pre constr.) | 2.310 ft/sec | (0.704 m/sec) |
| Volumetric Water flow rate | 3.000 gal/min | (11.36 lit/min) |
| Average pellet length | 0.362 in | (0.919 cm) |
| Std Dev of Ave Length | 0.010 in | (0.026 cm) |
| Average pellet diameter | 0.179 in | (0.455 cm) |
| Std Dev of Ave Diam | 0.005 in | (0.013 cm) |
| Example 10 | | |
| Water flow (in constr.) | 26.160 ft/sec | (7.97 m/sec) |
| Water flow (pre constr.) | 3.080 ft/sec | (0.939 m/sec) |
| Volumetric Water flow rate | 4.000 gal/min | (15.14 lit/min) |
| Average pellet length | 0.350 in | (0.890 cm) |
| Std Dev of Ave Length | 0.010 in | (0.025 cm) |
| Average pellet diameter | 0.179 in | (0.455 cm) |
| Std Dev of Ave Diam | 0.005 in | (0.012 cm) |
| Example 11 | | |
| Water flow (in constr.) | 32.700 ft/sec | (9.97 m/sec) |
| Water flow (pre constr.) | 3.860 ft/sec | (1.177 m/sec) |

|  |  |  |
|---|---|---|
| Volumetric Water flow rate | 5.000 gal/min | (18.93 lit/min) |
| Average pellet length | 0.325 in | (0.825 cm) |
| Std Dev of Ave Length | 0.016 in | (0.041 cm) |
| Average pellet diameter | 0.181 in | (0.461 cm) |
| Std Dev of Ave Diam | 0.004 in | (0.009 cm) |

Examples 7–11 demonstrate that pellets can be made using a wide range of pelleting fluid flow rates. As the pelleting fluid flow rate is increased (6.54 to 32.7 feet/second), the pellet length decreases slightly (0.45 to 0.33 in).

EXAMPLES 12–13

| Example 12 | | |
|---|---|---|
| Gap Length | 0.394 inch | (1.00 cm) |
| Volumetric water flow rate | 2.0 gal/min | (7.6 lit/min) |
| Water flow (pre constr.) | 1.54 ft/sec | (0.47 m/sec) |
| Water flow (in constr.) | 13.08 ft/sec | (3.99 m/sec) |
| Constriction zone ID | 0.250 in | (0.635 cm) |
| Dope Orifice ID | 0.180 in | (0.457 cm) |
| Dope Temperature | 74.3° F. | (23.5° C.) |
| Water Temperature | 54.6° F. | (12.6° C.) |
| Dope viscosity | 186,000 cp | |
| No. Pellets Measured | 20 | |
| Dope % Polymer | 20.0 wt % | |
| Linear Dope flow rate | 0.006 ft/sec | (0.0018 m/sec) |
| Dope mass flow rate | 0.004 lb/min | (2.00 gr/min) |
| Average pellet length | 0.363 in | (0.923 cm) |
| Std Dev of Ave Length | 0.007 in | (0.017 cm) |
| Average pellet diameter | 0.175 in | (0.444 cm) |
| Std Dev of Ave Diam | 0.004 in | (0.011 cm) |
| Example 13 | | |
| Gap Length | 0.197 inch | (0.50 cm) |
| Volumetric water flow rate | 3.0 gal/min | (11.4 lit/min) |
| Water flow (pre constr.) | 0.10 ft/sec | (0.03 m/sec) |
| Water flow (in constr.) | 30.36 ft/sec | (9.25 m/sec) |
| Constriction zone ID | 0.201 in | (0.511 cm) |
| Dope Orifice ID | 0.110 in | (0.279 cm) |
| Dope Temperature | 127.9° F. | (53.3° C.) |
| Water Temperature | 80.4° F. | (26.9° C.) |
| Dope viscosity | 186,000 cp | |
| No. Pellets Measured | 20 | |
| Dope % Polymer | 20.0 wt % | |
| Linear Dope flow rate | 1.624 ft/sec | (0.4950 m/sec) |
| Dope mass flow rate | 0.440 lb/min | (199.80 gr/min) |
| Average pellet length | 0.250 in | (0.635 cm) |
| Std Dev of Ave Length | 0.026 in | (0.065 cm) |
| Average pellet diameter | 0.098 in | (0.248 cm) |
| Std Dev of Ave Diam | 0.006 in | (0.016 cm) |

Examples 12–13 demonstrate that pellets can be made over a wide range of dope flow rates (0.006 to 1.624 ft/sec). There is little change in pellet length at different dope flow rates.

EXAMPLES 14–18

Variables common to examples 14–18 are listed below:

|  |  |  |
|---|---|---|
| Gap Length | 0.394 inch | (1.00 cm) |
| Volumetric water flow rate | 4.0 gal/min | (15.1 lit/min) |
| Water flow (pre constr.) | 3.08 ft/sec | (0.94 m/sec) |
| Water flow (in constr.) | 11.63 ft/sec | (3.54 m/sec) |
| Constriction zone ID | 0.250 in | (0.635 cm) |
| Dope Orifice ID | 0.167 in | (0.424 cm) |
| Dope Temperature | 72.0° F. | (22.2° C.) |
| Dope mass flow rate | 0.022 lb/min | (10.0 gr/min) |
| Linear Dope flow rate | 0.031 ft/sec | (0.0094 m/sec) |
| Number of Pellets measured | 20 | |
| Example 14 | | |
| Dope viscosity | 41,000 cp | |
| Dope % polymer | 15.0 wt % | |
| Dope Temperature | 73.5° F. | (23.1° C.) |
| Average pellet length | 0.263 in | (0.669 cm) |
| Std Dev of Ave Length | 0.014 in | (0.036 cm) |
| Average pellet diameter | 0.162 in | (0.411 cm) |
| Std Dev of Ave Diam | 0.007 in | (0.017 cm) |
| Example 15 | | |
| Dope viscosity | 89,000 cp | |
| Dope % polymer | 18.0 wt % | |
| Dope Temperature | 77.2° F. | (25.1° C.) |
| Average pellet length | 0.381 in | (0.968 cm) |
| Std Dev of Ave Length | 0.011 in | (0.027 cm) |
| Average pellet diameter | 0.181 in | (0.460 cm) |
| Std Dev of Ave Diam | 0.006 in | (0.014 cm) |
| Example 16 | | |
| Dope viscosity | 186,000 cp | |
| Dope % polymer | 20.0 wt % | |
| Dope Temperature | 72.0° F. | (22.2° C.) |
| Average pellet length | 0.350 in | (0.890 cm) |
| Std Dev of Ave Length | 0.010 in | (0.025 cm) |
| Average pellet diameter | 0.179 in | (0.455 cm) |
| Std Dev of Ave Diam | 0.005 in | (0.012 cm) |
| Example 17 | | |
| Dope viscosity | 301,000 cp | |
| Dope % polymer | 22.0 wt % | |
| Dope Temperature | 73.0° F. | (22.8° C.) |
| Average pellet length | 0.378 in | (0.959 cm) |
| Std Dev of Ave Length | 0.012 in | (0.030 cm) |
| Average pellet diameter | 0.181 in | (0.460 cm) |
| Std Dev of Ave Diam | 0.006 in | (0.016 cm) |
| Example 18 | | |
| Dope viscosity | 399,000 cp | |
| Dope % polymer | 24.0 wt % | |
| Dope Temperature | 74.0° F. | (23.3° C.) |
| Average pellet length | 0.337 in | (0.855 cm) |
| Std Dev of Ave Length | 0.020 in | (0.051 cm) |
| Average pellet diameter | 0.183 in | (0.464 cm) |
| Std Dev of Ave Diam | 0.008 in | (0.021 cm) |

Examples 14–18 demonstrate the effect of dope viscosity on pellet length. Above a minimum dope viscosity (41,000 cp), there is very little effect of dope viscosity (41,000 cp to 399,000 cp) on pellet length (0.263 inch to 0.337 inch). Below the minimum dope viscosity (41,000 cp), the pellets are deformed by the drag forces.

EXAMPLE 19

| Example 19 | | |
|---|---|---|
| Gap Length | 0.197 inch | (0.50 cm) |
| Linear Dope flow rate | 0.413 ft/sec | (0.1259 m/sec) |
| Dope mass flow rate | 0.1443 lb/min | (65.5 gr/min) |
| Constriction zone ID | 0.141 in | (0.358 cm) |
| Dope Orifice ID | 0.125 in | (0.318 cm) |
| Dope Temperature | 104° F. | (40.0° C.) |
| Water Temperature | 70° F. | (21.3° C.) |
| Dope % polymer | 20.0 wt % | |
| Dope viscosity | 120,000 cp | |
| Number of pellets measured | 20 | |
| Percent Acetic Acid in liquid | 77.0 % | |
| Percent Water in liquid | 23.0 % | |
| Liquid flow (in constr.) | 17.15 ft/sec | (5.23 m/sec) |
| Volumetric Lliquid flow rate | 0.83 gal/min | (3.14 lit/min) |

-continued

| Example 19 | | |
|---|---|---|
| Average pellet length | 0.213 in | (0.541 cm) |
| Std Dev of Ave Length | 0.008 in | (0.021 cm) |
| Average pellet diameter | 0.138 in | (0.350 cm) |
| Std Dev of Ave Diam | 0.003 in | (0.008 cm) |

Example 19 demonstrates that a miscible liquid can be used as the pelleting fluid. In this case, the polymer, cellulose acetate, is soluble in the pelleting fluid. This demonstrates that precipitation of the polymer is not necessary for pellet formation.

EXAMPLES 20–21

Variables common to examples 20–21 are listed below:

| | | |
|---|---|---|
| Gap Length | 0.157 inch | (0.40 cm) |
| Linear Dope flow rate | 0.0070 ft/sec | (0.0021 m/sec) |
| Dope mass flow rate | 0.0044 lb/min | (2.0 gr/min) |
| Constriction zone ID | 0.250 in | (0.635 cm) |
| Dope Orifice ID | 0.167 in | (0.424 cm) |
| Water Temperature | 51.3° F. | (10.7° C.) |
| Dope Temperature | 71.3° F. | (21.8° C.) |
| Dope % polymer | 20.0 wt % | |
| Dope viscosity | 301,000 cp | |
| Number of pellets measured | 20 | |
| Example 20 | | |
| Air Pressure | 3.0 psi | |
| Water flow (in constr.) | 13.1 ft/sec | (4.0 m/sec) |
| Volumetric Water flow rate | 2.0 gal/min | (7.6 lit/min) |
| Average pellet length | 0.182 in | (0.462 cm) |
| Std Dev of Ave Length | 0.011 in | (0.028 cm) |
| Average pellet diameter | 0.157 in | (0.400 cm) |
| Std Dev of Ave Diam | 0.006 in | (0.015 cm) |
| Example 21 | | |
| Air Pressure | 6.0 psi | |
| Water flow (in constr) | 6.5 ft/sec | (2.0 m/sec) |
| Volumetric Water flow rate | 1.0 gal/min | (3.8 lit/min) |
| Average pellet length | 0.198 in | (0.504 cm) |
| Std Dev of Ave Length | 0.013 in | (0.034 cm) |
| Average pellet diameter | 0.157 in | (0.400 cm) |
| Std Dev of Ave Diam | 0.004 in | (0.010 cm) |

Examples 20–21 demonstrate that the pelleting fluid can be comprised of a liquid or a gas, or a mixture of a liquid and a gas. Other appropriate gases (e.g., air, nitrogen) can be used as the pelleting fluid.

EXAMPLE 22

Example 22 demonstrates that a pelleting fluid comprising only a gas may be used to form pellets in accordance with the present invention.

| | | |
|---|---|---|
| Gap Length | 0.157 inch | (0.40 cm) |
| Linear Dope flow rate | 0.006 ft/sec | (0.0018 m/sec) |
| Dope mass flow rate | 0.0044 lb/min | (2.0 gr/min) |
| Constriction zone ID | 0.250 in | (0.635 cm) |
| Dope Orifice ID | 0.167 in | (0.424 cm) |
| Dope Temperature | 74.6° F. | (23.7° C.) |
| Dope % polymer | 24.0 wt % | |
| Dope viscosity | 400,000 cp | |
| Number of pellets measured | 20 | |
| Air Pressure | 15.0 psi | |
| Water flow (in constr.) | 0.0 ft/sec | (0.0 m/sec) |
| Volumetric Water flow rate | 0.0 gal/min | (0.0 lit/min) |

-continued

| | | |
|---|---|---|
| Average pellet length | 0.161 In | (0.409 cm) |
| Std Dev of Ave Length | 0.069 In | (0.175 cm) |
| Average pellet diameter | 0.084 In | (0.213 cm) |
| Std Dev of Ave Diam | 0.018 In | (0.046 cm) |

Figure 5:
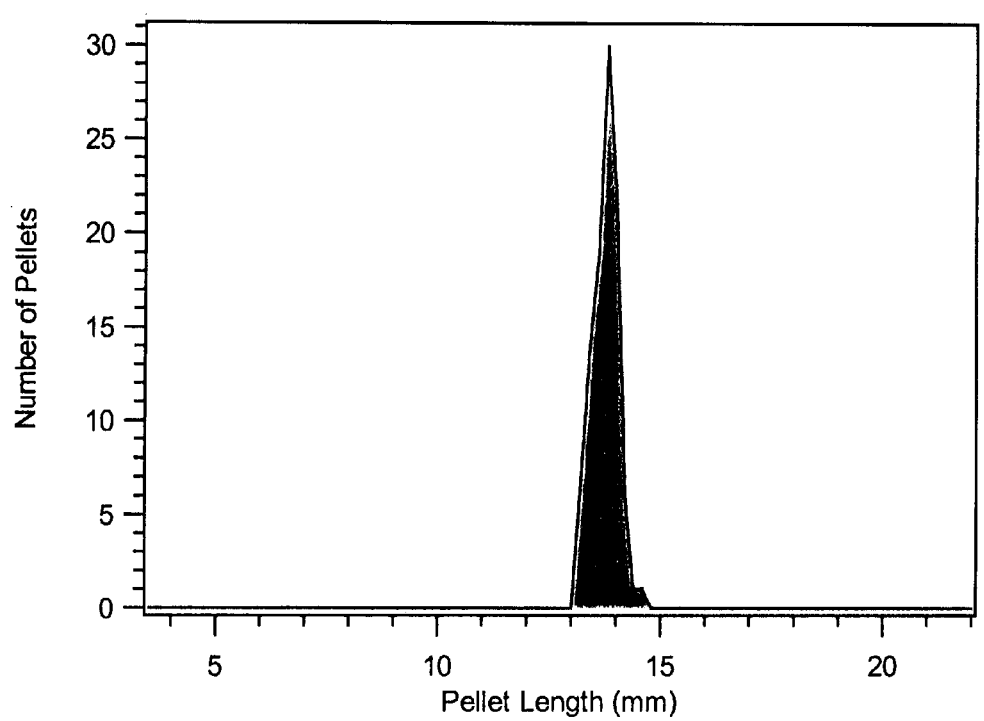
FIG. 5 is a histogram of pellet size distribution illustrating the controlled size of pellets formed in accordance with the present invention.

The examples above demonstrate that using the process of the present invention, pellets of a viscous material can be produced having a substantially uniform size distribution with a narrow standard distribution of pellet widths and lengths, as seen in FIG. 5. Pellets with lengths ranging from 0.039 inches to 11.59 inches and widths ranging from 0.118 inches to 0.197 inches were prepared with greater than 95% of the pellets having a standard deviation of less than about 12%, preferably less than about 10% and more preferably less than about 5%. Although water, acetic acid and air were used as the pelletizing medium, one skilled in the art will understand that any suitable fluid may be used. Moreover, in accordance with the present invention, it is possible to make pellets using a mixture of fluid phases, such as liquid and gas.

Although the present invention has been described in terms of the presently preferred embodiment, it is to be understood that such disclosure is not to be interpreted as limiting to the invention described herein. No doubt that after reading the disclosure, various alterations and modifications will become apparent to those skilled in the art to which the invention pertains. It is intended that the appended claims be interpreted as covering all such alterations and modifications as fall within the spirit and scope of the invention.

What is claimed is:

1. A process of forming discrete pellets from a viscous material, comprising:
   a. extruding said viscous material from a first opening of a first conduit into a pelletizing fluid traveling at a first velocity in a first zone; and
   b. passing said extruded viscous material and pelletizing fluid into a second zone having a step-wise reduced pressure relative to said first zone and wherein the velocity of the pelletizing fluid increases to a second velocity to form discrete pellets of a substantially uniform size distribution.

2. The process of claim 1 wherein said second zone includes a second opening through which said viscous material and pelletizing fluid must enter and wherein said first zone has a length defined by a distance measured from an end of said first conduit proximate to said first zone to said opening of said second zone.

3. The process of claim 2 wherein a cross-sectional dimension of said first opening is less than a cross-sectional dimension of said second opening.

4. The process of claim 2 wherein said pellet has a length directly proportional to said first zone length.

5. The process of claim 1 wherein said viscous material has a viscosity greater than about 40,000 centipoise.

6. The process of claim 5 wherein said second velocity is greater than about 3 ft/sec.

7. The process of claim 1 wherein said viscous material is selected from the group consisting of esters and polyesters of the group consisting of PET and PEN; cellulose derivatives selected from the group consisting of cellulose acetate, cellulose propionate, cellulose butyrate, ethyl cellulose, methyl cellulose and benzyl cellulose; polyolefins selected from the group consisting of polyethylene and polypropylene; polyamides; polystyrenes; copolymers of the aforementioned polymers, and mixtures thereof.

8. A process for making discrete pellets from a viscous material comprising the steps of:
   a. extruding said viscous material from a first opening in a first conduit into a pelletizing fluid stream in a first zone traveling at a first velocity; and
   b. passing said pelletizing fluid stream through a second zone comprising a restriction means, said restriction means producing a second fluid velocity and a step-wise reduction in pelletizing fluid pressure in said second zone relative to said first zone to form discrete pellets of a substantially uniform size having less than about 12% standard deviation in average size distribution.

9. The process of claim 8 wherein said restriction means includes a second opening substantially aligned with said first opening of said first conduit.

10. The process of claim 9 further comprises a second conduit at least partially surrounding said first conduit and through which said pelletizing fluid stream flows, and wherein said restriction means includes a surface for impeding the flow of pelletizing fluid in said second conduit and wherein said second opening provides a passage through said fluid impeding surface.

11. The process of claim 9 wherein said first zone has an length defined by a distance measured from said first opening to said second opening and wherein said distance is greater than zero.

12. The process of claim 8 wherein a ratio of said second velocity to said first velocity is greater than about 3.

13. The process of claim 8 wherein a ratio of said second velocity to said first velocity is greater than about 5.

14. The process of claim 8 wherein said viscous material is selected from the group consisting of esters and polyesters of the group consisting of PET and PEN; cellulose derivatives selected from the group consisting of cellulose acetate, cellulose propionate, cellulose butyrate, ethyl cellulose, methyl cellulose and benzyl cellulose; polyolefins selected from the group consisting of polyethylene and polypropylene; polyamides; polystyrenes; copolymers of the aforementioned polymers, and mixtures thereof.

15. The process of claim 8 wherein said pellets have less than about 10% standard deviation in average size distribution.

16. The process of claim 8 wherein said pellets have less than about 5% standard deviation in average size distribution.

17. The process of claim 8 wherein said pelletizing fluid is a single-phase fluid.

18. The process of claim 8 wherein said pelletizing fluid is a multi-phase fluid mixture.

19. The process of claim 9 wherein said first opening has a cross-sectional dimension less than a cross-sectional dimension of said second opening.

20. The process of claim 9 wherein said first opening has a cross-sectional dimension greater than a cross-sectional dimension of said second opening.

21. The process of claim 9 wherein said first opening has a cross-sectional dimension equal to a cross-sectional dimension of said second opening.

22. A process for making discrete pellets from a viscous material comprising the steps of:
   a. providing a viscous material in a first conduit;
   b. providing a pelletizing fluid stream traveling at a first velocity in a second conduit, wherein said second conduit partially surrounds said first conduit;
   c. extruding said viscous material from a first opening in said first conduit into said pelletizing fluid stream in a first zone; and
   d. passing said pelletizing fluid stream through a second zone comprising a restriction means, said restriction means having a fluid impeding surface and a second opening in said fluid impeding surface and substantially aligned with said first opening, said second zone having a step-wise fluid pressure reduction and fluid velocity increase relative to said first zone whereby discrete pellets are formed having a substantially uniform size with less than about 12% standard deviation in average size distribution.

23. The process of claim 22 wherein said first zone has an length defined by a distance measured from said first opening to said second opening and wherein said distance is greater than zero.

24. The process of claim 22 wherein said viscous material is selected from the group consisting of esters and polyesters of the group consisting of PET and PEN; cellulose derivatives selected from the group consisting of cellulose acetate, cellulose propionate, cellulose butyrate, ethyl cellulose, methyl cellulose and benzyl cellulose; polyolefins selected from the group consisting of polyethylene and polypropylene; polyamides; polystyrenes; copolymers of the aforementioned polymers, and mixtures thereof.

25. The process of claim 22 wherein said pellets have less than about 5% standard deviation in average size distribution.

* * * * *